(12) United States Patent
Kohli

(10) Patent No.: US 8,137,637 B2
(45) Date of Patent: Mar. 20, 2012

(54) PARTICULATE FILTER AND METHOD OF MAKING

(75) Inventor: Jeffrey Todd Kohli, Corning, NY (US)

(73) Assignee: Corning Incorporated, Corning, NY (US)

( * ) Notice: Subject to any disclaimer, the term of this patent is extended or adjusted under 35 U.S.C. 154(b) by 577 days.

(21) Appl. No.: 12/274,938

(22) Filed: Nov. 20, 2008

(65) Prior Publication Data

US 2010/0124519 A1    May 20, 2010

(51) Int. Cl.
*B01D 50/00*    (2006.01)

(52) U.S. Cl. ........................ 422/180; 422/177

(58) Field of Classification Search .................. 422/177, 422/180

See application file for complete search history.

(56) References Cited

U.S. PATENT DOCUMENTS

| 6,508,852 B1 | 1/2003 | Hickman et al. ................ 55/523 |
| 7,294,164 B2 * | 11/2007 | Merkel ............................ 55/523 |
| 2008/0110341 A1 * | 5/2008 | Ketcham et al. ................ 95/274 |

FOREIGN PATENT DOCUMENTS

| EP | 1375849 A2 * | 1/2004 |
| JP | 2001205108 A * | 7/2001 |

OTHER PUBLICATIONS

Eberhard Jacob, Raimund Müller, The SCRi Concept for Exhaust Gas Aftertreatment, ATZautotechnology 01-0212008 vol. 8, p. 20.

* cited by examiner

*Primary Examiner* — Tom Duong
(74) *Attorney, Agent, or Firm* — Matthew B. McNutt

(57) ABSTRACT

A particulate filter includes first and second honeycomb substrates. An outlet face of a first substrate is positioned against an inlet face of a second substrate such that channels extending longitudinally through the substrates are aligned to form continuous channels. A continuous skin is joined to each of the substrates to form a unified substrate. A portion of the continuous channels are selectively plugged to form a wall flow filter.

12 Claims, 3 Drawing Sheets

PARTICULATE FILTER AND METHOD OF MAKING

BACKGROUND

The present invention relates generally to systems for purifying exhaust gases from internal combustion engines. More specifically, the invention relates to particulate filters and methods of making particulate filters.

Combustion of fuel in an internal combustion engine produces particulates, such as soot, and other fuel combustion emissions such as carbon monoxide, hydrocarbons, and nitrogen oxides. Wall-flow particulate filters are often used in engine exhaust systems to remove particulates from the exhaust gas. Wall-flow particulate filters are typically made of a honeycomb-like substrate with parallel flow channels (also referred to as cells) separated by internal porous walls. Inlet and outlet ends of the flow channels are selectively plugged, such as in a checkerboard pattern, so that exhaust gas, once inside the substrate, is forced to pass through the internal porous walls, whereby the porous walls retain a portion of the particulates in the exhaust gas. In this manner, wall-flow particulate filters have been found to be effective in removing particulates from exhaust gas.

In addition to filtering particulates from exhaust gas, in some embodiments an oxidation catalyst may be applied to a filter to facilitate the oxidation of soot to $CO_2$. In some applications, use of an oxidation catalyst to oxidize hydrocarbons and carbon monoxide, plus treatment of $NO_x$, would also be desirable. However, in the latter case, incorporation of the oxidation catalyst function into the filter is not common practice because the filter substrate is generally of high thermal mass. The high thermal mass of the filter increases the time required for the filter to reach a temperature sufficient to "light-off" of the oxidation catalyst(s) and commence the oxidation of hydrocarbons and carbon monoxide, plus treatment of $NO_x$, and therefore the efficiency of the catalyst function is decreased (i.e., insufficient quantities of hydrocarbons, $NO_x$ and carbon monoxide are catalyzed). To overcome this thermal lag time and increase oxidation of hydrocarbons and carbon monoxide, plus treatment of $NO_x$, a higher concentration of precious metals (e.g. platinum group metals (PGM) such as platinum, palladium, or rhodium) is typically required to meet emission requirements. Therefore, rather than incorporating the hydrocarbon, $NO_x$, and carbon monoxide oxidation catalyst functions into the filter, it is common practice to have a separate oxidation catalyst located upstream of the filter, where the hydrocarbon, $NO_x$, and carbon monoxide oxidation catalyst is applied to a low thermal mass flow-through substrate. $NO_x$ catalysts are often placed downstream of the filter as well.

There is interest in incorporating additional catalytic functionality on a particulate filter. In particular, combining filtering and catalyzing functions may provide both weight and space savings, which is important for both passenger cars and commercial vehicles. Therefore the ability to tailor properties and microstructure of the filter substrate so as to best utilize and protect the catalysts, while maintaining the proper filtration efficiency and pressure drop is also of interest.

SUMMARY

In one broad aspect, embodiments provide a wall flow particulate filter. One implementation comprises first and second honeycomb substrates each having an inlet face, an outlet face, and a plurality of channels extending therebetween. The outlet face of the first substrate is positioned against the inlet face of the second substrate such that the channels of the first substrate are aligned with the channels of the second substrate to form continuous channels extending from the inlet face of the first substrate to the outlet face of the second substrate. A portion of the continuous channels are selectively plugged at the inlet face of the first substrate and another portion of the channels are selectively plugged at the outlet face of the second substrate. A continuous skin joined to each of the first substrate and the second substrate to join the first substrate and the second substrate as a single unit.

In another broad aspect, embodiments provide a method of manufacturing a particulate filter. One implementation comprises the steps of forming a first honeycomb substrate having a first set of properties, separately forming a second honeycomb substrate having a second set of properties different from the first set of properties, positioning an outlet face of the first substrate against an inlet face of the second substrate, aligning channels of the first and second substrates to form continuous channels extending from an inlet face of the first substrate to an outlet face of the second substrate, applying a continuous skin around the aligned first and second substrates to join the first and second substrates as a single unit, and selectively plugging inlet and outlet ends of the continuous channels.

Other features and advantages of the invention will be apparent from the following description and the appended claims.

BRIEF DESCRIPTION OF THE DRAWINGS

The accompanying drawings, described below, illustrate typical embodiments of the invention and are not to be considered limiting of the scope of the invention, for the invention may admit to other equally effective embodiments. The figures are not necessarily to scale, and certain features and certain view of the figures may be shown exaggerated in scale or in schematic in the interest of clarity and conciseness.

DETAILED DESCRIPTION

Figure 1:
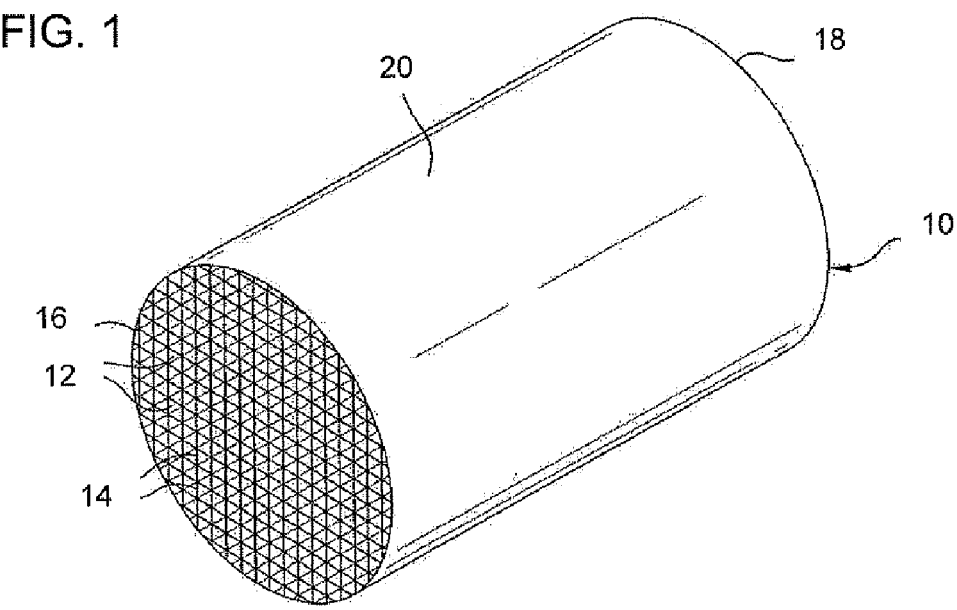
FIG. 1 is a perspective view of an exemplary embodiment of a flow-through honeycomb substrate.

The invention will now be described in detail with reference to exemplary embodiments illustrated in the accompanying drawings. In describing the exemplary embodiments, numerous specific details are set forth in order to provide a thorough understanding of the invention as set forth in the accompanying claims. However, it will be apparent to one skilled in the art that the invention may be practiced without some or all of these specific details. In other instances, well-known features and/or process steps have not been described in detail so as not to unnecessarily obscure the invention. In addition, like or identical reference numerals are used to identify common or similar elements.

Figure 2:
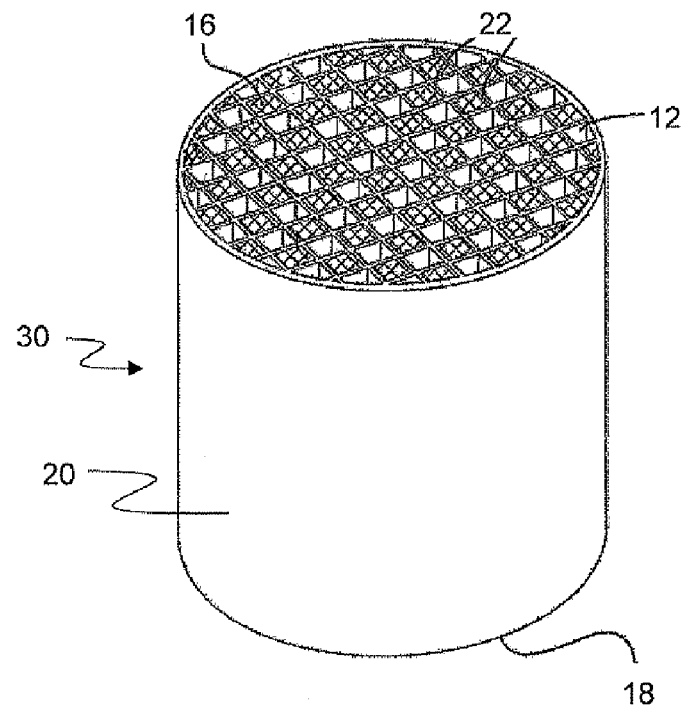
FIG. 2 is a perspective view of a wall flow particulate filter created by selectively plugging inlet and outlet ends of the flow channels is the flow-through honeycomb substrate of FIG. 1.

Referring to FIG. 1, an exemplary honeycomb substrate 10 is illustrated. Substrate 10 includes a plurality of parallel flow channels 12 (also referred to as cells) separated by internal porous walls 14. Channels 12 extend from an inlet end 16 to an outlet end 18 of substrate 10. A skin 20 defines the outer periphery of substrate 10. Typically formed in a continuous or semi continuous extrusion process, the properties of substrate 10 are generally uniform from the inlet end 16 to the outlet end 18. To create a filter 30 (FIG. 2), inlet and outlet ends of flow channels 12 are selectively blocked with plugs 22, such as in a checkerboard pattern, so that exhaust gas, once inside substrate 10, is forced to pass through internal porous walls 14, whereby walls 14 retain a portion of the particulates in the exhaust gas.

Figure 3:
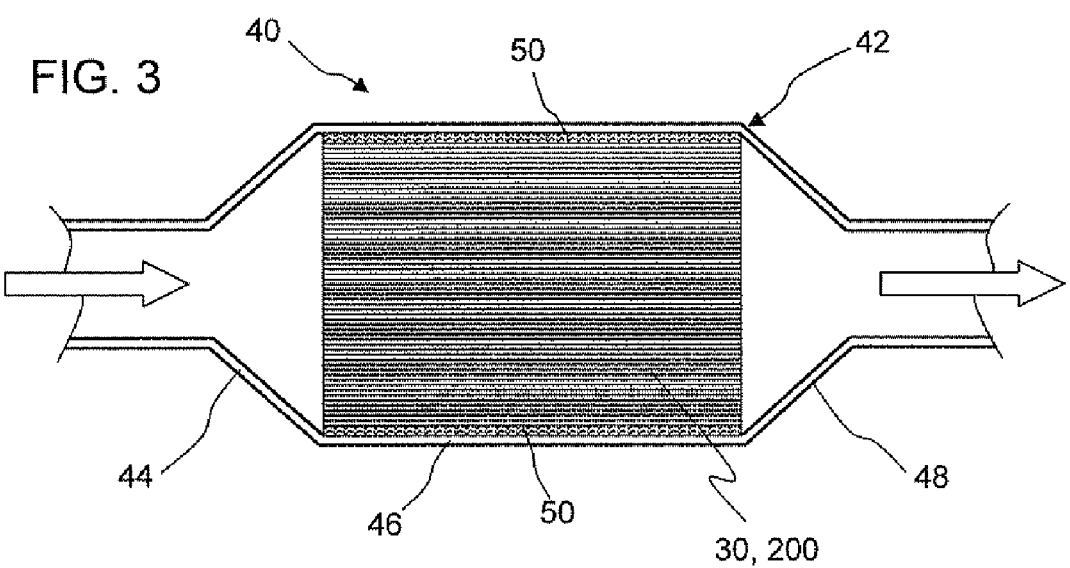
FIG. 3 is a schematic illustration of an exhaust after-treatment system using a particulate filter.

FIG. 3 schematically depicts an exhaust after-treatment system 40 for processing exhaust gas from an internal combustion engine (not shown) using a particulate filter, such as particulate filter 30 described above or particulate filter 200 described below. Exhaust after-treatment system 40 includes a housing 42 that, in one embodiment, is manufactured from a metal, such as steel. In one example, housing 42 includes an inlet section 44 adapted to interconnect to the engine (not shown), a purification section 46, and an outlet section 48 which may be optionally interconnected to a tailpipe (not shown). Exhaust after-treatment system 40 includes therein a particulate filter, such as filter 30 or filter 200. The filter may be mounted within housing 42 using a mat system 50, such as a vermiculite based intumescent mat or an alumina fiber-based non-intumescent mat.

As noted above, there is interest in incorporating additional catalytic functionality on exhaust gas particulate filters. However, catalyst technologies are generally sensitive to high temperatures. For example, most $NO_x$ catalysts degrade significantly at temperatures as low as about 650° to 850° C. In exhaust after-treatment systems in which a catalyst is applied to the filter (e.g., to facilitate the oxidation of soot to $CO_2$), the catalyst is typically preferentially applied toward the inlet end of the filter, rather than uniformly applied to the entire length of the filter. The non-uniform application of the catalyst is referred to as "zone coating." The inlet end of a filter typically experiences lower temperatures than the outlet end of the filter during soot regeneration events. Thus, zone coating the catalyst toward the inlet end of the filter serves to protect the catalyst from thermal degradation caused by high regeneration temperatures found at the outlet region of the filter, e.g. during uncontrolled regeneration events.

High washcoat loadings on the walls 14 adjacent the inlet end 16 of the filter 30 (resulting from zone coating of the catalyst) can significantly and undesirably increase backpressure of the filter 30. In addition, zone coating can create a tendency for non-uniform soot build-up in the filter 30. In particular, soot may build up toward the outlet end 18 of the filter 30, rather than being distributed relatively uniformly throughout the filter 30. Accordingly, a filter whose properties can be varied or tailored over its length so as to best utilize and protect the catalyst, while maintaining the proper filtration efficiency and pressure drop over the length of the filter is useful. However, it is extremely difficult to vary material properties along the length of a filter using a continuous or even semi-continuous extrusion process.

According to embodiments described herein, two or more separately formed honeycomb-like substrates having different properties are intimately mechanically joined by a continuous peripheral material (an external "skin") to form a unified substrate having properties that vary from the inlet end to the outlet end of the unified structure. The longitudinally oriented through-channels of the individual substrates are aligned to form continuous channels in the unified structure. Inlet and outlet ends of the aligned channels of the unified structure are selectively plugged or blocked to form a filter. In certain embodiments, interior surfaces of one or more of the individual substrates include active catalytic species. In some embodiments, the catalysts are oxidation catalysts comprising one or more platinum group metal (PGM) dispersed on or in one or more of the substrates in order to convert hydrocarbons (HC), NOx, CO and other gaseous pollutants and particulates, i.e., soot particles, by catalyzing the oxidation of these pollutants. In some embodiments, the substrates are selected to provide a relatively high porosity in areas where high catalyst washcoat loadings are to be applied, such that all or a majority of the catalyst is in the wall of the substrate (i.e., within the porosity of the wall) rather than on the wall of the substrate.

FIGS. 4A-4E schematically illustrate an exemplary method of combining a plurality (i.e., two or more) discrete substrates 10 to make a single filter 200 that may be used in an exhaust gas after-treatment system 40 as shown in FIG. 3. Substrates 10 have properties that differ from each other such that when the plurality of substrates 10 are joined together, the resulting filter 200 has properties that vary over the length of filter 200. For example, in one embodiment, filter 200 may have a porosity level and/or pore size distribution that is different at the inlet region of the filter 200 as compared to the outlet region of the filter 200.

As used herein, reference to substrate or filter "properties" is intended to include microstructure properties, macrostructure properties, and physical properties of the substrate or filter. Exemplary microstructure properties include, without limitation, total porosity, surface porosity, pore size distribution, median pore size, grain size distribution, grain morphology, grain orientation, phase distribution, incorporated catalyst distribution (e.g., extruded zeolite), micro- or nano-crack concentration, etc. Exemplary macrostructure properties include, without limitation, wall thickness, cell density, inlet to outlet ratios, etc. Exemplary physical properties include, without limitation, material, coefficient of thermal expansion (CTE), thermal mass or heat capacity, modulus of rupture (MOR), elastic modulus (Emod), toughness, etc.

Figure 4A:
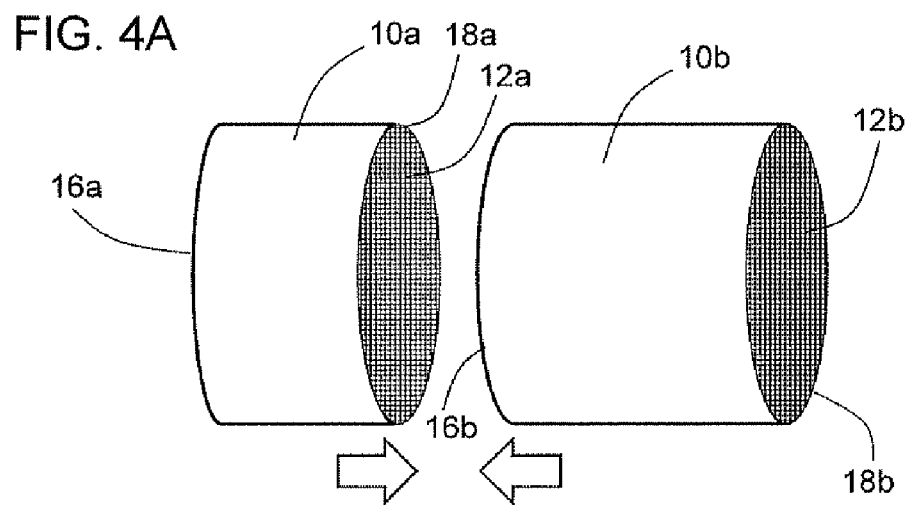
FIGS. 4A-4E schematically illustrate one exemplary method of forming a particulate filter having properties that vary over the length of the filter.
Figure 4B:
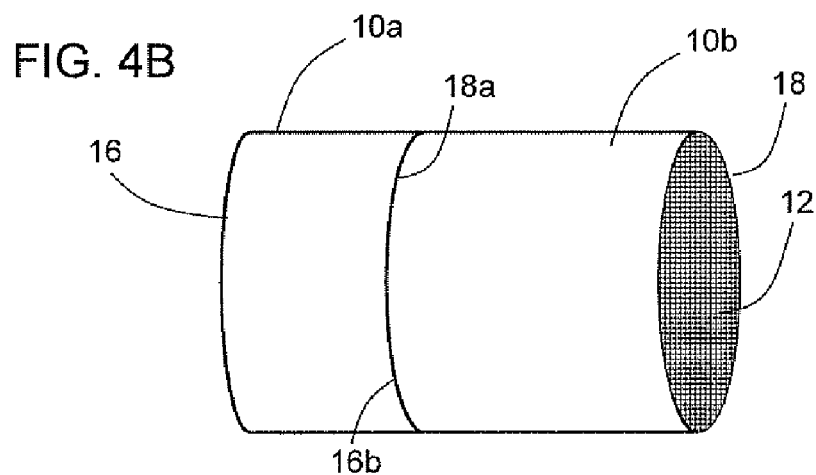
Figure 4C:
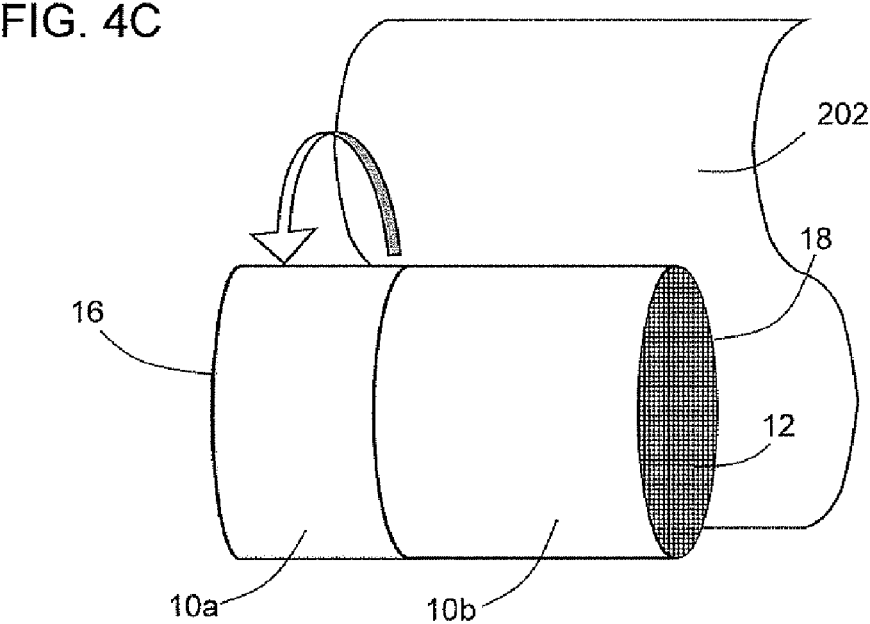

Referring to FIG. 4A, in one exemplary implementation, a plurality of discrete and unique substrates 10 (e.g., substrates 10a, 10b in the illustration) are separately manufactured (e.g., extruded, cut, dried, and optionally fired) using processes that are known and practiced in the art. Substrates 10 are selected for their particular properties and are brought together along a common axis in an end-to-end orientation.

The substrates 10 are aligned (FIG. 4B) such that the channels 12 of one substrate 10 are directly associated with corresponding channels 12 of the adjoining substrate 10 (e.g., channels 12a are aligned with channels 12b in the exemplary illustration). Channels 12 thereby align to form channels extending continuously through the substrates 10. Such alignment requires that the cell density and dimensions of substrates 10 are closely matched. Alignment of the channels 12 may be achieved using any suitable technique, such as optically guided alignment, mechanically guided alignment, laser guided alignment, etc.

In one embodiment, substrates 10 are joined when dry or green. If substrates 10 are dried, the mating ends of the substrates 10 (e.g., outlet end 18a of substrate 10a and inlet end 16b of substrate 10b) may be wetted prior to their alignment and connection to facilitate a more robust connection at the cell walls, in the manner of creating a "tack weld" between the mated surfaces. In another embodiment, the mating ends of the substrates (e.g., outlet end 18a and inlet end 16b) may be provided with a bonding cement (aligned with the cell walls) to facilitate connection and eliminate "leaks" between adjacent channels.

Figure 4D:
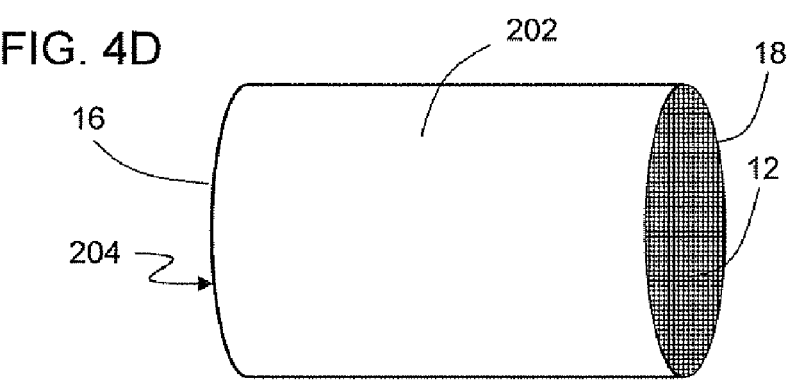

After alignment and physical contact of substrates 10 is completed, the substrates 10 are joined together by an applied skin 202 (FIG. 4C) to form a unified substrate 204. Skin 202 may be applied using any of the skinning techniques currently known to those skilled in the art and used to apply a skin to honeycomb substrates. The application of skin 202 may be an automated process, or may completely or partially comprise a manual process. After skin 202 is applied, it is dried and fired so as to permanently bond the skin and unique substrate sections into a single structure 204, as shown in FIG. 4D.

Figure 4E:
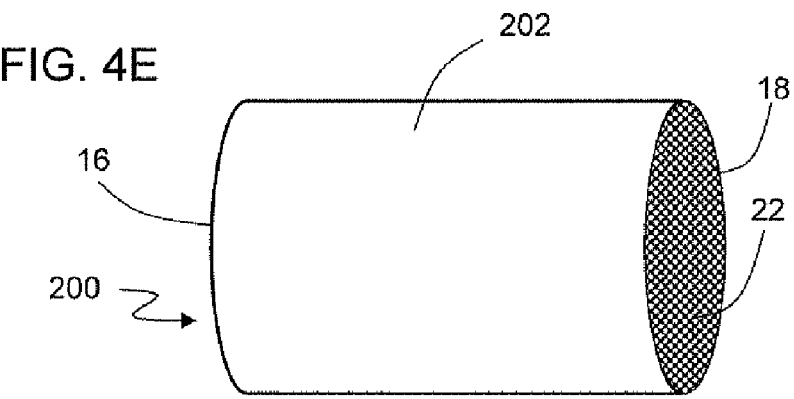

The now continuous channels 12 of the unified substrate 204 may be selectively plugged or blocked at the inlet end and outlet end of the unified substrate 204 to form wall-flow filter 200 (FIG. 4E). Again, plugging of continuous channels 12 may be accomplished using any of the techniques currently known for plugging honeycomb substrates to form a wall flow filter. The plugging process may be an automated process, or may completely or partially comprise a manual process. Additionally, the inlet and outlet ends of channels 12 may be plugged and fired using a single plug material, or with unique plug materials optimized for each of the two substrates 10 at the ends of the filter 200.

In the illustrated implementation, two discrete substrates 10a, 10b are joined to create a single wall-flow filter 200. However, in other embodiments, the number and lengths of substrates 10 can be varied from that illustrated to meet the specific requirements of the filter application. Specifically, filter 200 may be comprised of two, three, four, five or more discrete substrates 10. In some embodiments, when three or more substrates 10 are joined together, two of the substrates may have substantially the same properties, while being separated by one or more substrates having different properties.

In one embodiment, substrates 10 forming filter 200 are comprised of similar or identical materials (e.g., the substrates 10 are all cordierite, all aluminum titanate, all silicon carbide, etc.), but the substrates 10 have at least different microstructures (e.g., at least one of porosity level, pore size distribution, median pore size, etc., is different between substrates 10).

In one embodiment, the material composition of the filter 200 is different at the inlet region of the filter as compared to the outlet region of the filter. In one embodiment, substrates 10 forming filter 200 are comprised of different materials (e.g., cordierite and aluminum titanate, etc.), but the substrates 10 have similar microstructures (e.g., at least one of porosity, pore size distribution, median pore size, etc., is similar between substrates 10). In another embodiment, substrates 10 forming filter 200 are comprised of different materials (e.g., cordierite and aluminum titanate, etc.), but the substrates 10 have different microstructures (e.g., at least one of porosity, pore size distribution, median pore size, etc., is different between substrates 10).

In one embodiment, substrates 10 forming filter 200 are comprised of materials having substantially similar thermal expansion properties, particularly after any catalysts are applied to the substrates. When there is a strong mechanical bond between substrates 10, the thermal expansion characteristics of the substrates 10 are preferably compatible to reduce or minimize thermally-induced stress that may lead to cracking between the substrates. In one embodiment, the coefficients of thermal expansion (CTE) of substrates 10 are in the range of about $-20 \times 10^{-7}$ $K^{-1}$ (from 25-1000° C.) to about $20 \times 10^{-7}$ $K^{-1}$ (from 25-1000° C.). In one embodiment, the CTEs of substrates 10 are approximately equal. In one embodiment, the CTEs of substrates 10 differ by less than about 50% (e.g., a first substrate has a CTE of about $10 \times 10^{-7}$ $K^{-1}_{(25\text{-}1000\ C)}$ and a second substrate has a GTE of less than about $15 \times 10^{-7}$ $K^{-1}_{(25\text{-}1000\ C)}$). In other embodiments, the CTEs of substrates 10 differ by less than about 100%, i.e., a factor of 2 (e.g., a first substrate has a CTE of about $10 \times 10^{-7}$ $K^{-1}_{(25\text{-}1000\ C)}$ and a second substrate has a CTE of less than about $20 \times 10^{-7}$ $K^{-1}_{(25\text{-}1000\ C)}$, or a first substrate has a CTE of about $15 \times 10^{-7}$ $K^{-1}_{(25\text{-}1000\ C)}$, and a second substrate has a CTE of less than about $30 \times 10^{-7}$ $K^{-1}_{(25\text{-}1000\ C)}$).

In one embodiment, the thermal expansion properties of skin 202 (after firing) is substantially similar to the thermal expansion properties of substrates 10. In one embodiment, the CTE of skin 202 is in the range of about $-20 \times 10^{-7}$ $K^{-1}$ (from 25-1000° C.) to about $20 \times 10^{-7}$ $K^{-1}$ (from 25-1000° C.). In one embodiment, the CTE of skin 202 and the CTE of substrates 10 are approximately equal. In one embodiment, the CTE of skin 202 and the CTE of substrates 10 differ by less than about 100%, i.e., a factor of 2 (e.g., the skin has a CTE of about $10 \times 10^{-7}$ $K^{-1}_{(25\text{-}1000\ C)}$ and the substrates have a CTE of less than about $20 \times 10^{-7}$ $K^{-1}_{(25\text{-}1000\ C)}$, or the substrates have a CTE of about $15 \times 10^{-7}$ $K^{-1}_{(25\text{-}1000\ C)}$, and the skin has a CTE of less than about $30 \times 10^{-7}$ $K^{-1}_{(25\text{-}1000\ C)}$). It should be understood that the exemplary values of the CTEs of the substrates and skin are provided only to clearly illustrate what is intended by the described 50% and 100% differences in CTEs, and such values are in no way intended to be limiting.

In one embodiment, the substrates 10 have similar thermal expansion properties but different thermal masses. For example, the combination of substrates 10 formed of cordierite and aluminum titanate is beneficially employed since cordierite and aluminum titanate have similar thermal expansion properties but different thermal masses. In particular, cordierite has a lower thermal mass than aluminum titanate. The lower thermal mass of cordierite provides good light-off performance for catalysts thereon (i.e., the cordierite is quickly heated to the temperatures required for catalysis), while the higher thermal mass of aluminum titanate provides greater durability (i.e., higher soot mass limit and better resistance to thermo-chemical attack by ash). Accordingly, in one embodiment, a cordierite substrate section may be positioned at the inlet end of filter 200, and an aluminum titanate substrate section may be positioned at the outlet end of filter 200.

In one embodiment, substrates 10 forming filter 200 have porosities in the range from about 30% to about 75%. In one embodiment, the porosities of substrates 10 differ by more than about 5%. In other embodiments, the porosities of substrates 10 differ by more than about 20%.

In one embodiment, at least one of porosity and pore size distribution is different between substrates 10, and is selected to facilitate the incorporation of different catalysts in different regions of the filter 200, while maintaining a preferred property of the filter 200 over its entire length (e.g., pressure drop, filtration efficiency, thermal-mechanical properties, heat capacity or other desirable attributes). As an example, in one embodiment, filter 200 is formed of two dried substrate sections 10a, 10b (e.g., 5.66 inch diameter round substrates, each having a cell density of about 200 cells per square inch and a cell wall thickness of about 16 mil). First substrate section 10a is made of a high porosity (e.g., porosity in the range of about 60%) cordierite, and second substrate section 10b is made of a lower porosity (e.g., porosity in the range of about 50%) aluminum titanate. The skin 202 is a composition that forms cordierite during firing and has a porosity level (e.g., porosity in the range of about 30% to about 60%) which is also unique compared to substrate sections 10a, 10b. Channels 12 of the integrated filter 200 are plugged and fired with a cordierite-based plug material.

Exemplary filter embodiments described herein facilitate combinations of functionalities (e.g., different catalyst materials for NOx, HC, CO, or C-conversion to less harmful gaseous species) within a single filter. The exemplary embodiments provide space savings, while enabling multiple functionalities without compromising desirable properties (e.g., pressure drop, filtration efficiency, thermal shock resistance) over the length of the filter. Specifically, filter embodiments as described herein have spatial property variation that allows the functionality of the filter to be partitioned with respect to various catalysis reactions (gas phase) while maintaining a filtration capability (solid phase) which is uninterrupted over the length of the filter. Moreover, in some embodiments, regions of the filter (i.e., the inlet) are desirably provided with a low thermal mass for hydrocarbon (HC) or carbon monoxide (CO) catalyst light-off, while other regions of the filter are provided with a high thermal mass to maintain a desirable soot mass limit.

While the invention has been described herein with respect to a limited number of exemplary embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A wall flow particulate filter comprising:
   a first honeycomb substrate having an inlet face, an outlet face, and a plurality of channels extending therebetween;
   a second honeycomb substrate having an inlet face, an outlet face, and a plurality of channels extending therebetween;
   wherein the first substrate and the second substrate are different in at least one of porosity, median pore size, and pore size distribution;
   wherein the outlet face of the first substrate is positioned against the inlet face of the second substrate such that the channels of the first substrate are aligned with the channels of the second substrate to form continuous channels extending from the inlet face of the first substrate to the outlet face of the second substrate, and wherein a portion of the continuous channels are selectively plugged at the inlet face of the first substrate and another portion of the channels are selectively plugged at the outlet face of the second substrate; and
   a continuous skin joined to each of the first substrate and the second substrate to join the first substrate and the second substrate as a single unit.

2. The filter of claim 1, wherein a catalytic material is incorporated into at least one of the first substrate and the second substrate.

3. The filter of claim 1, wherein the first substrate has a first porosity and second substrate has a second porosity different from the first porosity, the difference in porosity being at least 5%.

4. The filter of claim 3, wherein the first substrate has a first porosity and second substrate has a second porosity different from the first porosity, the difference in porosity being at least 20%.

5. The filter of claim 1, wherein the first substrate is formed of a first material, and the second substrate is formed from a second material different from the first material.

6. The filter of claim 5, wherein the first substrate is formed of cordierite and the second substrate is formed of aluminum titanate.

7. The filter of claim 1, wherein a CTE of the first substrate and a CTE of the second substrate differ by less than about a factor of 2.

8. The filter of claim 7, wherein the CTE of at least one of the first and second substrates is measured after the substrate is catalyzed.

9. The filter of claim 7, wherein the CTE of the first substrate and the CTE of the second substrate are substantially the same.

10. The filter of claim 9, wherein the CTE of at least one of the first and second substrates is measured after the substrate is catalyzed.

11. The filter of claim 1, wherein the first substrate is formed from a first material having a first set of properties, and wherein the second substrate is also formed from the first material but having a second set of properties.

12. The filter of claim 11, wherein the first and second substrates are both formed from one of cordierite, aluminum titanate, and silicon carbide.

* * * * *